United States Patent [19]

Teranishi et al.

[11] Patent Number: 4,652,911
[45] Date of Patent: Mar. 24, 1987

[54] SOLID-STATE COLOR IMAGE SENSOR WITH MATRIX-TYPE COLOR FILTER FORMED OF FILTER ELEMENTS EACH TRANSMITTING RED, GREEN AND BLUE LIGHT

[75] Inventors: Nobukazu Teranishi; Akiyoshi Kohno, both of Tokyo, Japan

[73] Assignee: NEC Corporation, Tokyo, Japan

[21] Appl. No.: 647,742

[22] Filed: Sep. 6, 1984

[30] Foreign Application Priority Data

Sep. 7, 1983 [JP] Japan .................................. 58-164493

[51] Int. Cl.$^4$ ........................ H04N 9/077; H04N 9/07
[52] U.S. Cl. ......................................... 358/44; 358/43
[58] Field of Search ........................ 358/41, 43, 44, 48

[56] References Cited

U.S. PATENT DOCUMENTS 4,437,112 3/1984 Tanaka et al. .......................... 358/44
4,460,919 7/1984 Takemura ............................. 358/44

FOREIGN PATENT DOCUMENTS 4680 1/1982 Japan ..................................... 358/44
109488 7/1982 Japan ..................................... 358/44
211718 12/1983 Japan ..................................... 358/44

Primary Examiner—James J. Groody
Assistant Examiner—Randall S. Svihla
Attorney, Agent, or Firm—Burns, Doane, Swecker & Mathis

[57] ABSTRACT

A solid-state image sensor includes a color filter covering a solid-state imaging device and having at least three kinds of filter elements arranged in rows and columns. Each of the filter elements transmits red, green, and blue light over its entire surface area with a transmittance of at least 20 to 80 percent for each color light.

5 Claims, 24 Drawing Figures $\ell_1 + \ell_2$ $\ell_3 + \ell_4$ $\ell_2 + \ell_3$ $\ell_4 + \ell_5$ $l_1 + l_2$ $l_3 + l_4$ $l_2 + l_3$ $l_4 + l_5$

SOLID-STATE COLOR IMAGE SENSOR WITH MATRIX-TYPE COLOR FILTER FORMED OF FILTER ELEMENTS EACH TRANSMITTING RED, GREEN AND BLUE LIGHT

BACKGROUND OF THE INVENTION

1. Field of the Invention

This invention relates to a solid-state image sensor such as a charge-coupled imaging device covered with a color filter, and more particularly to an improvement of the color filter.

2. Description of the Prior Art

An interline type charge-coupled area imaging device is covered with a color filter to obtain a color imaging signal. The color filter used for a single-chip CCD imaging device has yellow, cyan and green filters as filter elements which are arranged in rows and columns. By adding and subtracting between signals produced from adjacent rows, blue and red signals are separated. A green signal is synthesized from the blue and red signals and a low range luminance signal.

However, according to the arrangement of the filter elements in the prior art, some rows and columns of filter elements lacks filters detecting one of three primary colors. For example, a color filter in the prior art, first kind of rows is made of yellow filters Ye transmitting red and green light and green filters G transmitting green light which are placed alternately. Second kind of rows is made of cyan filters Cy transmitting blue and green light and green filters G which are placed alternately. The first and second kinds of rows are arranged alternately. The first kind of rows cannot detect blue light and the second kind of rows cannot detect red light. Similarly, first kind of columns having yellow filters Ye, cyan filters Cy and green filters G and second kind of columns having green filters G and cyan filters Cy are arranged alternately. The second kind of columns cannot detect red light. Therefore, fine patterns of blue and red cannot be detected, causing a poor resolution in a reproduced picture.

SUMMARY OF THE INVENTION

The object of the present invention is to provide a solid-state color image sensor having a color filter which detects a fine color pattern and causes a high resolution in a reproduced picture.

According to the present invention, there is provided a solid-state color image sensor comprising a solid-state imaging device and a color filter formed on the solid-state imaging device and having a matrix of at least three kinds of filter elements arranged in rows and columns, all of the three kinds of filter elements transmitting all the three primary color light but having transmittances of the three primary color light such that output signals corresponding to blue and red light are respectively obtained by subtracting two signals obtained through predetermined two of the three kinds of filter elements from each other.

The color filter used in the solid-state color image sensor in accordance with the present invention is composed of filter elements each of which transmits all the three primary color light. Therefore, all the lights can be detected by every filter elements, causing a high resolution in a reproduced picture. Due to the fact that the transmittances of the three primary color light are set so that output signals corresponding to blue and red light are respectively obtained by subtracting two signals obtained through predetermined two of the three kinds of filter elements from each other, the output signals corresponding to each of three primary color light can be respectively derived by using a delay line producing a time delay of one horizontal scanning period, similar to the output from solid-state color imaging device in the prior art. Any special equipment is not required for color imaging apparatus producing a color television signal. The above and further objects, features and advantages of the present invention will become more apparent from the following detailed description taken in conjunction with the accompanying drawings, wherein:

Figure 4:
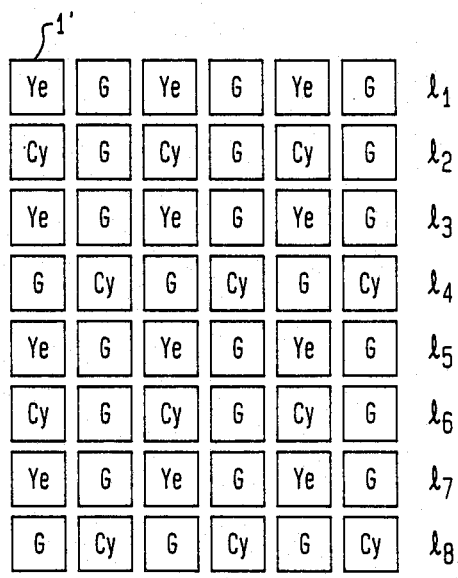
FIG. 4 is a plan view of the color filter in the prior art showing an arrangement of filter elements.
Figure 5A:
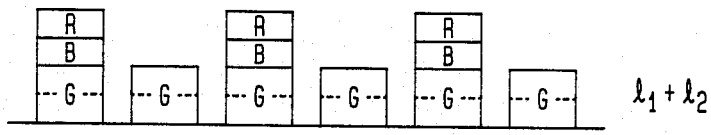
Figure 5B:
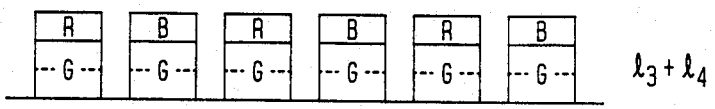
Figure 5C:
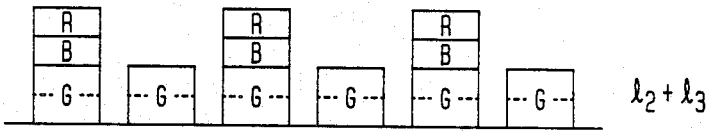
Figure 5D:
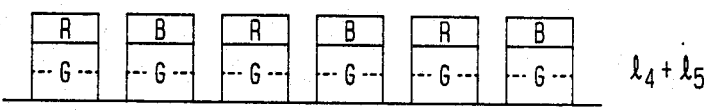
Figure 6:
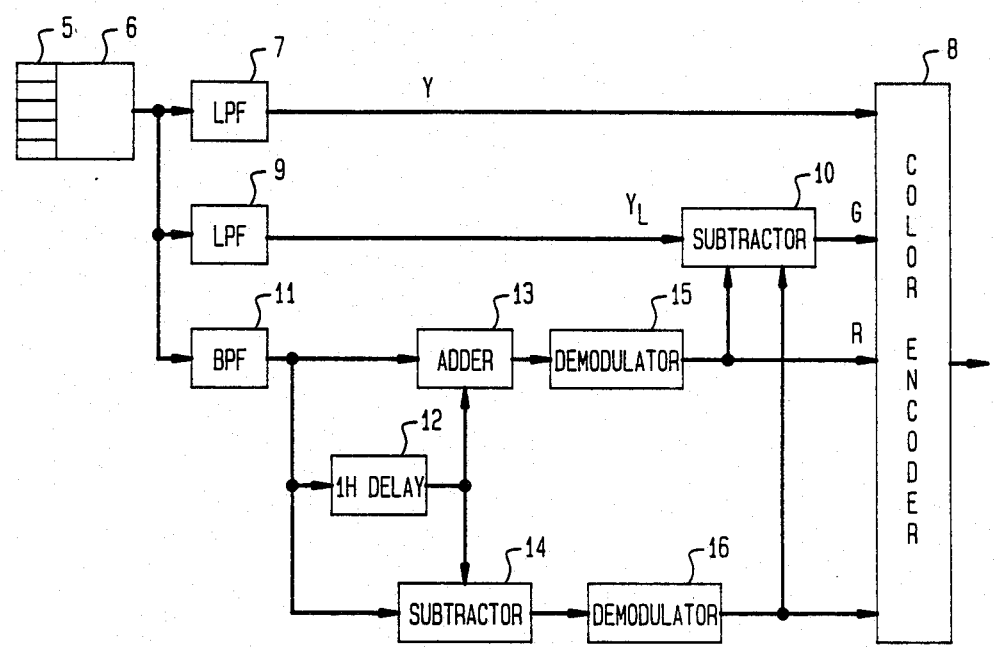
Figure 7:
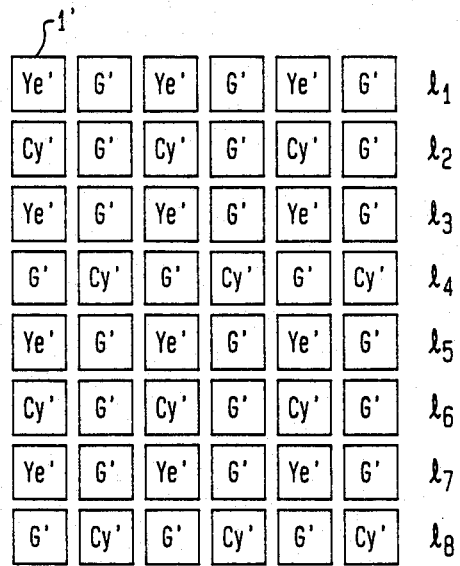
Figure 8:
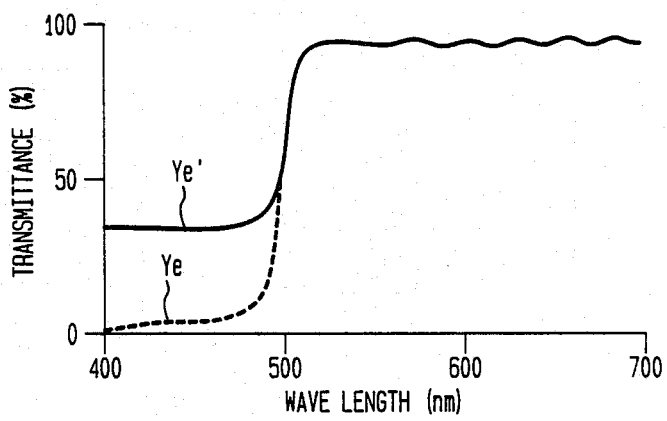
Figure 9:
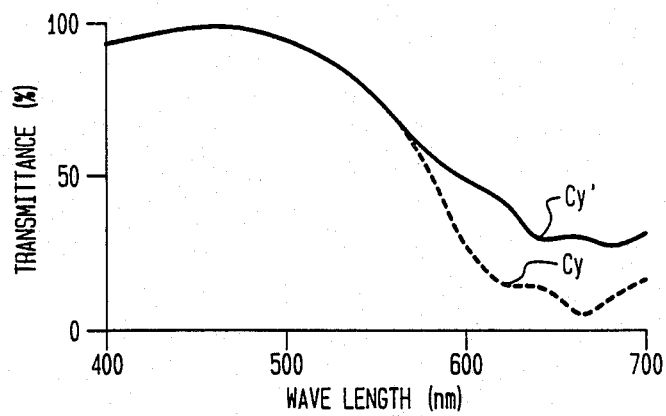
Figure 10:
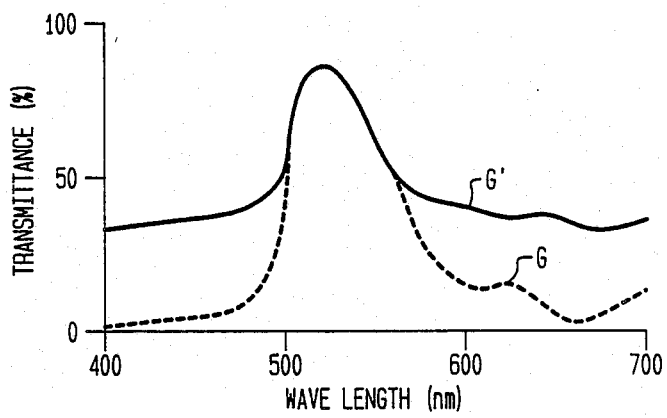
Figure 11A:
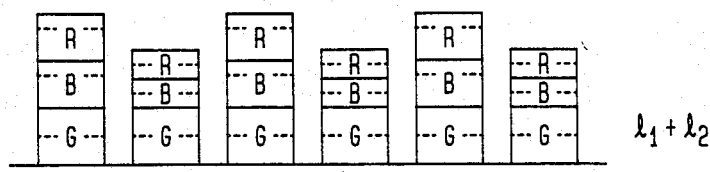
Figure 11B:
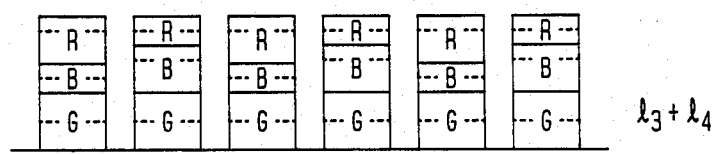
Figure 11C:
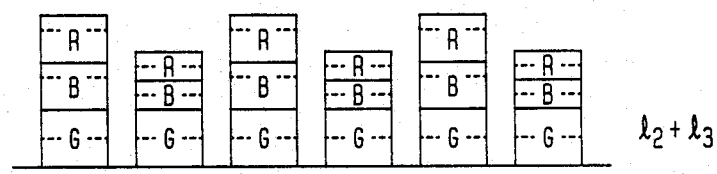
Figure 11D:
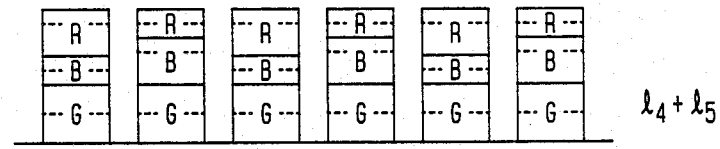
Figure 12:
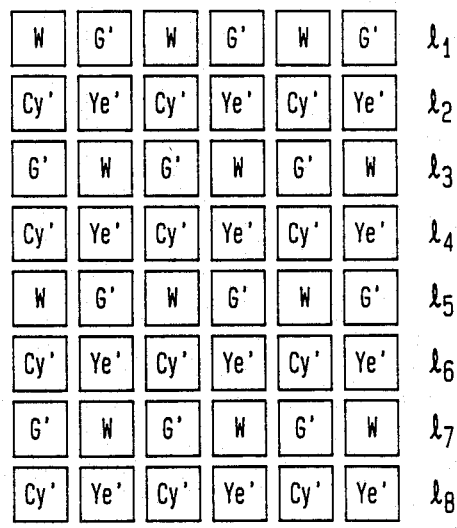
Figure 13:
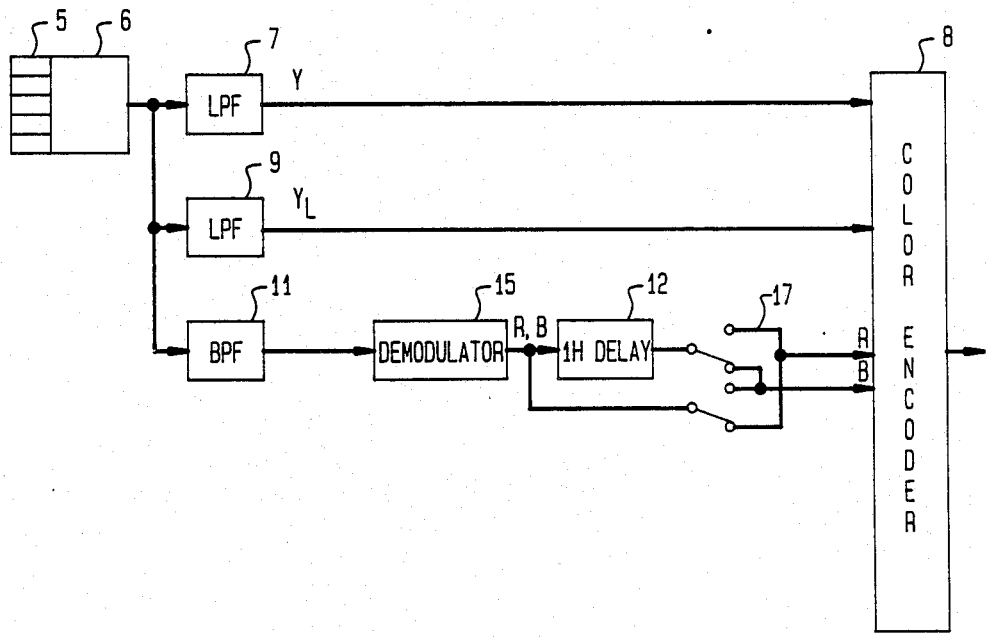
Figure 14:
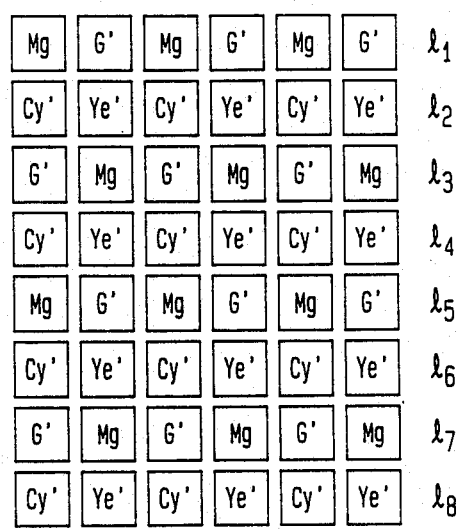
Figure 15:
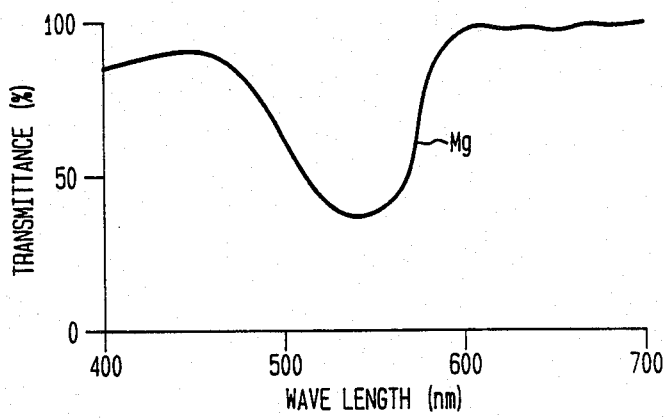

FIGS. 5(A) to 5(D) are explanatory views showing outputs obtained from the imaging device having the color filter shown in FIG. 4;

FIG. 6 is a block diagram showing an imaging apparatus using a single-chip interline type CCD imaging device;

FIG. 7 is a plan view of the color filter used in a first embodiment of the present invention;

FIGS. 8, 9 and 10 are graphs showing transmittances of yellow, cyan and green filters;

FIGS. 11(A) to 11(D) are explanatory views showing outputs obtained from the imaging device having the color filter shown in FIG. 7;

FIG. 12 is a plan view of the color filter used in a second embodiment of the present invention;

FIG. 13 is a block diagram showing a color imaging apparatus in which the color filters improved by the present invention are adaptable;

FIG. 14 is a plan view of the color filter used in a third embodiment of the present invention;

FIG. 15 is a graph showing a transmittance of magenta filter; and

Figure 16A:
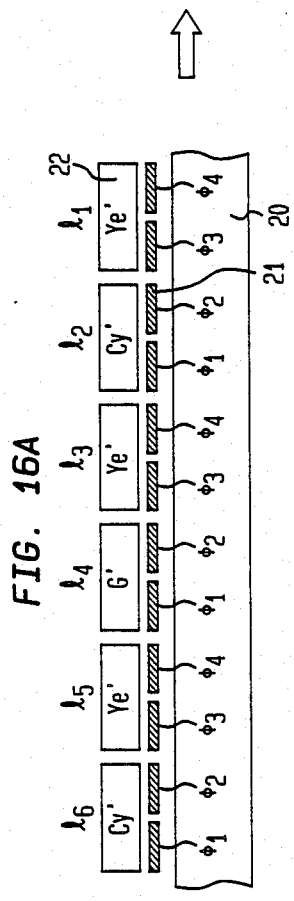
Figure 16B:
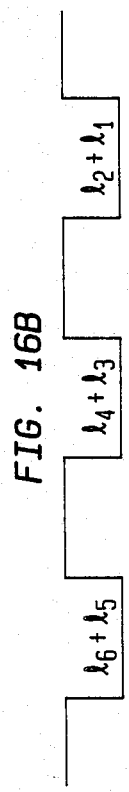
Figure 16C:

FIGS. 16(A) to 16(C) show a sectional view of frame transfer type CCD imaging device and diagrams showing its potential distributions.

Figure 1:
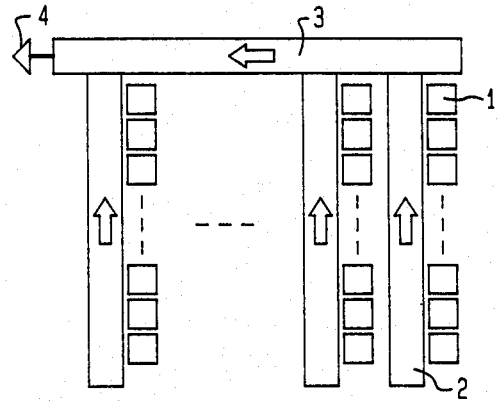
FIG. 1 is a schematical plan view of an interline-type CCD imaging device in the prior art.

The interline type charge-coupled imaging device (hereinafter, referred as an IL-CCD image device) is exemplarily shown in FIG. 1. A plurality of picture elements 1 which are photo sensors are arranged in rows and columns. The photo sensors may be MOS type sensors or diode type sensors. Along the rows, vertical CCD shift-registers 2 are provided to shift upward the charges generated at the picture element 1 and transferred to the shift-registers 2. At one ends of the shift-registers 2, a horizontal CCD shift-register 3 is provided to shift charges transferred from the vertical shift-registers 2. The charges shifted to the left-hand side of the horizontal CCD shift-register 3 are converted into electrical signals by a charge detector 4. The arrows in FIG. 1 show the direction in which charges are transferred. In the output signal, signals from the picture elements in one column are followed by signals from the picture elements in the subsequent column. For color image sensing, a color filter having a plurality of filter elements arranged in a matrix as shown in FIG. 4 which will be explained later covers the IL-CCD imaging device.

Figure 2:
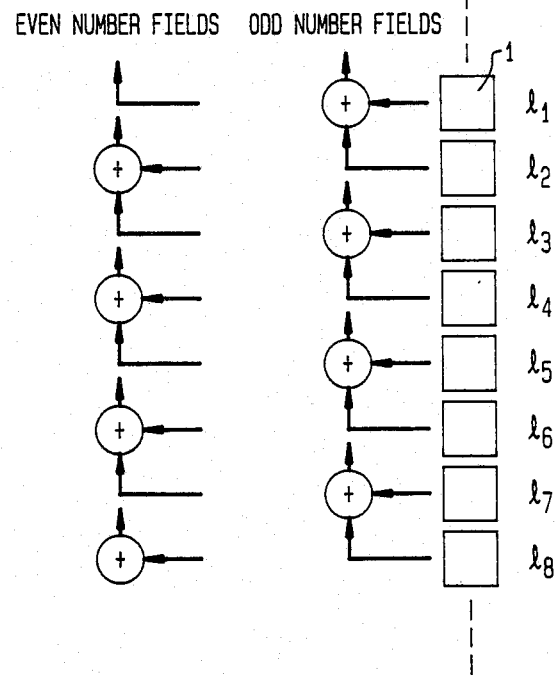
FIG. 2 is an explanatory view showing a process for leading out charges accumulated in the CCD imaging device in accordance with a field accumulation operation.

FIG. 2 shows one method for an interlace operation using the IL-CCD imaging device. This method is known as a field accumulation operation. Here, the rows of picture elements 1 are numbered as $l_1, l_2, l_3, \ldots l_8 \ldots$ in the order from row near the horizontal shift-register 3 to row far from the shift-register 3. In odd number fields, the charges are transferred to the shift-register 2 from the picture elements 1 in the rows $l_2, l_4, l_6, l_8 \ldots$. After charges are transferred in the shift-registers 2 by a distance corresponding to one interval of rows, charges are transferred to the shift-registers 2 from the picture elements in the rows $l_1, l_3, l_5, l_7 \ldots$ to add charges from rows $l_1$ and $l_2$, $l_3$ and $l_4$, $l_5$ and $l_6$, $l_7$ and $l_8 \ldots$ in the vertical shift-registers 2. Thereafter, the added charges are transferred to the horizontal shift-register 3 and then to the charge detector 4. In the even number fields, the charges accumulated in the picture elements in rows $l_1, l_3, l_5, l_7 \ldots$ are transferred to the vertical shift-registers 2, and then charges accumulated in the picture elements in rows $l_2, l_4, l_6, l_8 \ldots$ are transferred to the shift-registers 2 after the shift-registers 2 shift charges by a distance corresponding to an interval between rows. As a results, charges from rows $l_2$ and $l_3$, $l_4$ and $l_5$, $l_6$ and $l_7 \ldots$ are respectively added and transferred to the charge detector 4.

Figure 3:
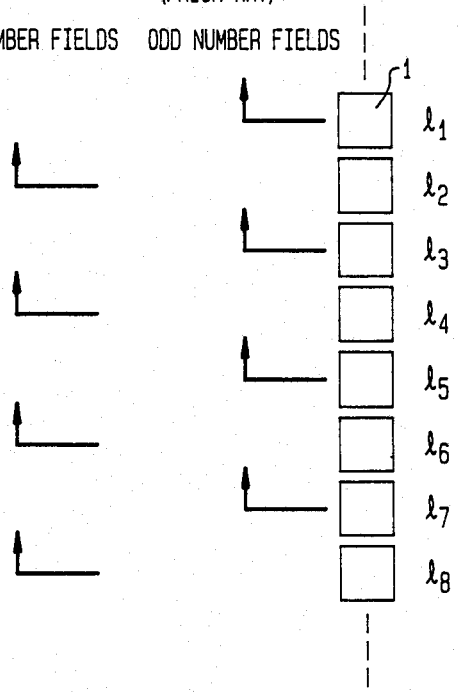
FIG. 3 is an explanatory view showing a process for leading out charges accumulated in the CCD imaging device in accordance with a frame accumulation operation.

FIG. 3 shows another method for the interlace operation which is called as a frame accumulation operation. In the odd number fields, charges are transferred from the picture elements in rows $l_1, l_3, l_5, l_7 \ldots$ to the vertical shift-registers 2 and then to the charge detector 4 through the horizontal shift register 3. In the even number fields, charges are transferred from the picture elements in the remaining rows $l_2, l_4, l_6, l_8 \ldots$ to the shift-registers 2 and then to the charge detector 4.

The interlace operation according to the frame accumulation operation is now mainly used. Therefore, the following explanation will be made with reference to the frame accumulation operation.

A conventional example of the color filter for the frame accumulation operation and adaptable to the IL-CCD imaging device is shown in FIG. 4 which exemplarily demonstrates the arrangement of three types of filter elements 1'. The position of each filter element 1' corresponds to the respective picture elements 1 in the IL-CCD imaging device. Then, rows of the filter elements 1' are numbered as $l_1, l_2, l_3 \ldots l_8 \ldots$, similarly to FIGS. 2 and 3. As the filter elements 1', yellow filters Ye transmitting red and green light, cyan filters Cy transmitting blue and green light and green filters G are employed. Filter elements are arranged in a period of two elements in a row and in a period of four elements in a column. That is, in rows $l_1, l_5 \ldots$, yellow and green filters Ye and G are placed in this order. In subsequent rows $l_2, l_6, \ldots$, cyan and green filters Cy and G are placed in this order. In rows $l_3, l_7, \ldots$, yellow any green filters Ye and G are placed in this order. In the remaining rows $l_4, l_8, \ldots$, green and cyan filters G and Cy are placed in this order.

FIGS. 5(A) to 5(D) show values of three primary color signals obtained by the interlacing in accordance with the field accumulation operation. In the drawing, B, G and R represent blue, green and red signals, respectively. By adding all the color signals in the subsequent two rows, a total value of $\frac{1}{2}B+2G+\frac{1}{2}R$ is obtained. This value is used as a luminance signal. Blue signal is added to the total value by $\frac{1}{2}B$ cos wt where w is a circular frequency corresponding to a period of two filter elements. Similarly, red signal is added by $\frac{1}{2}R$ cos wt. In the output from rows $l_3$ and $l_4$ and $l_4$ and $l_5$, the phase of blue signal is opposite to other outputs from rows $l_1$ and $l_2$ and $l_2$ and $l_3$. As a result, output signals can be expressed as follows:

$$S\{l_1+l_2\}=\tfrac{1}{2}B+2G+\tfrac{1}{2}R+\tfrac{1}{2}B\cos wt+\tfrac{1}{2}R\cos wt; \quad (1)$$

$$S\{l_3+l_4\}=\tfrac{1}{2}B+2G+\tfrac{1}{2}R-\tfrac{1}{2}B\cos wt+\tfrac{1}{2}R\cos wt; \quad (2)$$

$$S\{l_2+l_3\}=\tfrac{1}{2}B+2G+\tfrac{1}{2}R+\tfrac{1}{2}B\cos wt+\tfrac{1}{2}R\cos wt; \quad (3) \text{ and}$$

$$S\{l_4+l_5\}=\tfrac{1}{2}B+2G+\tfrac{1}{2}R-\tfrac{1}{2}B\cos wt+\tfrac{1}{2}R\cos wt, \quad (4)$$

FIG. 6 shows a block diagram of conventional color imaging apparatus or a color encoder using a single-chip IL-CCD imaging device. The output from the IL-CCD imaging device 6 covered with a color filter 5 is input to a color encoder 8 as a luminance signal Y through a low-pass filter 7 by which the modulated component of $\pm\tfrac{1}{2}B$ cos wt $+\tfrac{1}{2}R$ cos wt is removed. The output from the imaging device 6 is further added to a subtracting circuit 10 as a low range luminance signal $Y_L$ through another low pass filter 9. In addition, the output signal is applied to a band-pass filter 11 to separate the modulated component of $\pm\tfrac{1}{2}B$ cos wt $+\tfrac{1}{2}R$ cos wt. The modulated components obtained from lines $l_1$ and $l_2$, $l_3$ and $l_4$, $l_2$ and $l_3$ and $l_4$ and $l_5$ are as follows:

$$T\{l_1+l_2\}=\tfrac{1}{2}B\cos wt+\tfrac{1}{2}R\cos wt; \quad (5)$$

$$T\{l_3+l_4\}=-\tfrac{1}{2}B\cos wt+\tfrac{1}{2}R\cos wt; \quad (6)$$

$$T\{l_2+l_3\}=\tfrac{1}{2}B\cos wt+\tfrac{1}{2}R\cos wt; \text{ and} \quad (7)$$

$$T\{l_4+l_5\}=-\tfrac{1}{2}B\cos wt+\tfrac{1}{2}R\cos wt. \quad (8)$$

Thus obtained modulated component is applied to a delay line 12 to cause a time delay of one horizontal scanning period. The outputs from the band-pass filter 11 and the delay line 12 are added by an adder 13 to derive a modulated component of red signal, as follows:

$$T\{l_1+l_2\}+T\{l_3+l_4\}=R\cos wt; \text{ and}$$

$$T\{l_2+l_3\}+T\{l_4+l_5\}=R\cos wt.$$

On the other hand, the outputs from the band-pass filter 11 and the delay line 12 are subtracted from each other by a subtractor 14 to derive a modulated component of blue signal, as follows:

$$T\{l_1+l_2\}-T\{l_3+l_4\}=B\cos wt; \text{ and} \quad (9)$$

$$T\{l_2+l_3\}-T\{l_4+l_5\}=B\cos wt. \quad (10)$$

The modulated component of red and blue signals are demodulated by the demodulators 15 and 16, respectively, to obtain red and blue signals R and B, respectively. The subtracting circuit 10 subtracts the red and blue signals R and B from the low range luminance signal $Y_L$ to obtain a green signal G. Finally, thus obtained luminance signal, green signal, red signal and blue signal are applied to the color encoder 8 to compose a color television signal.

Returning to FIG. 4, the conventional color filter has a drawback as explained later. In rows $l_1, l_3, l_5, l_7 \ldots$, since only yellow filters Ye and green filters G are placed, a signal corresponding to blue light cannot be detected. In columns, blue light can be detected at one filter element (Cy) in every four filter elements. As a whole, the filter elements which detect blue light is one fourth of all the element. Similarly, the filter elements detecting red signal are one in every two element in rows and columns. Therefore, fine patterns of blue and red cannot be detected with high fidelity, resulting in a poor resolution in reproduced picture.

DESCRIPTION OF THE PREFERRED EMBODIMENTS

FIG. 7 is a color filter used in a first embodiment together with an interline type CCD imaging device. As the CCD imaging device, any kind of imaging device may be used. An example of the imaging device is as shown in FIG. 1. A plurality of filter elements 1 are arranged in rows and columns and composed of yellow filters Ye', green filters G' and cyan filters Cy'. The yellow filters Ye' transmit red and green light and partially transmit blue light. The transmittance of blue light is selected to be 20 to 80 percent. The transmittance characteristic of the yellow filter Ye' is shown in FIG. 8 in a case where about forty percent of blue light is transmitted. The cyan filter Cy' partially transmits red light in addition to blue and green light. The transmittance of red light is selected to be 20 to 80 percent. FIG. 9 shows its transmittance characteristics in the case where about 40 percent of red light is transmitted. The green filter G transmits green light and partially transmits blue and red light. The transmittances of blue and red light are respectively selected to be 20 to 80 percent. FIG. 10 shows its transmittance characteristics where about 40 percent of blue light and about 40 percent of red light are transmitted. In rows, one of the yellow and cyan filters and green filters are alternately placed. The repetition period of filter elements is two. Ones of columns have a repetition of filters of yellow Ye', cyan Cy', yellow Ye' and green G'. The other columns have a repetition of filters of three greens G' and one cyan Cy'. The repetition period of filter elements in columns is four. First and third rows $l_1, l_5 \ldots$ and $l_3, l_7 \ldots$ have a repetition of a yellow filter Ye' and a green filter G'. Second rows $l_2, l_6 \ldots$ have a repetition of a cyan filter Cy' and a green filter G'. Fourth rows $l_4, l_8 \ldots$ have a repetition of a green filter G' and a cyan filter Cy'. By adding the charge signals obtained from subsequent two rows in accordance with the field accumulation operation, there are obtained output signals as shown in FIGS. 11(A) to 11(D) in which B, G and R represent blue, green and red signals, respectively. A mean output of three primary signal when the filters having the characteristics shown in FIGS. 8, 9 and 10 are used is 1.1B+2G+1.1R which is used as a luminance signal. In the outputs from the rows $l_1$ and $l_2$ and the rows $l_2$ and $l_3$, the blue and red modulated components are added to the mean output as 0.3B cos wt and 0.3R cos wt where w is a circular frequency corresponding to a period of two filter elements in rows. That is, the output from the rows $l_1$ and $l_2$ and the rows $l_2$ and $l_3$ may be expressed as follows:

$$S\{l_1+l_2\}=S\{l_2+l_3\}=1.1B+2G+1.1R+0.3B \cos wt+0.3R \cos wt. \quad (11)$$

In the outputs from the rows $l_3$ and $l_4$ and the rows $l_4$ and $l_5$, the added blue modulated component is $-0.3$ cos wt, while the added red modulated component is 0.3 cos wt. Therefore, the output from the rows $l_3$ and $l_4$ and the rows $l_4$ and $l_5$ may be expressed as follows:

$$S\{l_3+l_4\}=S\{l_4+l_5\}=1.1B+2G+1.1R-0.3B \cos wt+0.3R \cos wt. \quad (12)$$

The equations (11) and (12) are different in coefficients from the equations (1) to (4) but similar to them. Therefore, the output from the imaging device having a color filter shown in FIG. 7 may be applied to the imaging apparatus having a system block diagram shown in FIG. 6, similar to the prior art, to compose a color television signal.

The color filter shown in FIG. 7 passes all three primary color light by more than twenty percent, respectively. The blue and red light exposed to any filter elements can be detected and reproduced in a picture. The fidelity to the figure to be imaged is improved and a high resolution is achieved in a reproduced picture. Here, if the transmittances of blue light through the yellow filter Ye', red light through the cyan filter Cy' and blue and red light through the green filter G' are less than twenty percent, the improvements of the fidelity to the figure to be imaged and the resolution in a reproduced picture is not sufficient. To the sufficient improvements, the transmittances should be selected at least twenty percent, and preferably in a range of thirty to sixty percent. The upper limit of the transmittances is eighty percent. If the transmittances are larger than eighty percent, amplitudes of modulated signal becomes small, causing a deteriorated signal-to-noise figure.

FIG. 12 is another color filter used in a second embodiment of the present invention which covers a CCD imaging device. The color filter is composed of white filters W, the yellow filters Y', the cyan filters Cy' and the green filters G'. The transmittances of blue, red and green light through the yellow, cyan and green filters Ye', Cy' and G' are same as those used in the color filter shown in FIG. 7. The white filters W are transparent and transmit all the three primary color light. Similar to the color filter shown in FIG. 7, the repetitions of filter elements in rows and columns are two and four. Ones of columns have a repetition of filters W, Cy', G' and Cy'. Other columns have a repetition of filters G', Ye', W and Ye'. First rows $l_1, l_5 \ldots$ have a repetition of filters W and G'. Second rows $l_2, l_6 \ldots$ have a repetition of filters Cy' and Ye'. Third rows $l_3, l_7 \ldots$ have a repetition of filters G' and W. The fourth rows $l_4, l_8$ have a repetition of filters Cy' and Ye'.

The mean output from the imaging device covered by the color filter shown in FIG. 12 using the filters Ye', Cy' and G' of which transmitting characteristics are shown in FIGS. 8 to 10 and the filters W is 1.4R+2G+1.4B which is used as a luminance signal. The modulated component of blue signal is 0.6B cos wt in the outputs from the rows $l_1$ and $l_2$ and the rows $l_4$ and $l_5$. The modulated component of red signal is $-0.6R$ cos wt in the outputs from the rows $l_2$ and $l_3$ and the rows $l_3$ and $l_4$. Therefore, the output obtained as the results of the frame accumulation operation may be expressed as follows:

$$S\{l_1+l_2\}=S\{l_4+l_5\}=1.4B+2G+1.4R+0.6B \cos wt; \text{ and} \quad (13)$$

$$S\{l_2+l_3\}=S\{l_3+l_4\}=1.4B+2G+1.4R-0.6R \cos wt. \tag{b 14}$$

Thus, the outputs from the rows $l_1$ and $l_2$ and the rows $l_4$ and $l_5$ have modulated components of blue signal only, while the outputs from the rows $l_2$ and $l_3$ and the rows $l_3$ and $l_4$ have modulated components of red signal only.

FIG. 13 shows an imaging apparatus used for composing a color television signal from a single-chip CCD imaging device 6 covered by a color filter 5 shown in FIG. 12. The same reference numerals representing the same components as in FIG. 6 are employed. The output from the imaging device 6 is applied to the color encoder 8 as a luminance signal Y through a low-pass filter 7. The output is also applied to the color encoder 8 as a low range luminance signal $Y_L$ through another low-pass filter 9 which passes lower frequency component than the low pass filter 7. The output is further applied to a band-pass filter 11 having a center frequency of the circular frequency w. The modulated components of blue and red signals are separated from the output from the imaging device 6 by the band-pass filter 11. The separated components are demodulated in the demodulator 15. As a result, a blue signal B is obtained from the output from the rows $l_1$ and $l_2$ and the rows $l_4$ and $l_5$, while a red signal R is obtained from the output from the rows $l_3$ and $l_4$ and the rows $l_4+l_5$. The demodulated signal is applied to the delay line 12 having a time delay of one horizontal scanning period. In horizontal scanning periods corresponding to outputs from the rows $l_1$ and $l_2$ and the rows $l_4$ and $l_5$, the delayed signal and non-delayed signal are applied to the color encoder 8 as blue and red signals B and R, respectively. In the other horizontal scanning periods corresponding to outputs from the rows $l_3$ and $l_4$ and the rows $l_4$ and $l_5$, the non-delayed and delayed signals are applied to the color encoder 8 as blue and red signals B and R, respectively. This switch is made by the switch 17. The color encoder 8 composes a color television signal.

The improvements in a high fidelity and a high resolution are achieved in cases using the color filter shown in FIG. 12, similarly to the case using the color filter shown in FIG. 7. The imaging device covered with the color filter shown in FIG. 12 requires neither adder nor subtracter to synthesize blue and red signals from the output therefrom. That is, the imaging apparatus can be made simple by using the color filter shown in FIG. 12.

FIG. 14 shows still other color filter used in a third embodiment of the present invention. The color filter is made of, as filter elements, filters Ye', Cy' and G' of which transmitting characteristics are the same as those in FIG. 12 and magenta filters Mg. The magenta filters Mg transmit blue and red light and about fifty percent of green light as shown in FIG. 15. The color filter uses the magenta filters Mg in place of the white filters W used in the color filter shown in FIG. 12. The arrangement of other filters Ye', Cy' and G' is similar to the color filter shown in FIG. 12.

When the respective color filters Ye', Cy', G' and Mg have the transmitting characteristics of FIGS. 8, 9, 10 and 15, the mean output of imaging device covered with the color filter shown in FIG. 14 is $1.4B+1.75G+1.4G$ which is used as a luminance signal. In outputs from the rows $l_1$ and $l_2$ and the rows $l_4$ and $l_5$, a color difference signal of $(0.6B-0.25G)$ is modulated with a circular frequency w and added to the luminance signal, as follows:

$$S\{l_1+l_2\}=S\{l_4+l_5\}=1.4B+1.75G+1.4R+(0.6B-0.25G)\cos wt. \tag{15}$$

In outputs from the rows $l_2$ and $l_3$ and the rows $l_3$ and $l_4$, a color difference signal of $-(0.6R-0.25G)$ is modulated with the circular frequency w and added to the luminance signal, as follows:

$$S\{l_2+l_3\}=S\{l_3+l_4\}=1.4B+1.75G+1.4R-(0.6R-0.25G)\cos wt. \tag{16}$$

The outputs from the rows $l_1$ and $l_2$ and the rows $l_4$ and $l_5$ have a modulated component of $(0.6B-0.25G) \cos wt$ only, while the outputs from the rows $l_2$ and $l_3$ and the rows $l_3$ and $l_4$ have a modulated component of $-(0.6R-0.25G) \cos wt$ only. Therefore, a color television signal may be produced by the imaging apparatus shown in FIG. 13.

The imaging device covered with the color filter shown in FIG. 14 has advantages similar to the imaging device covered with the color filter shown in FIG. 12. The fidelity and resolution in a reproduced picture are further improved. The imaging apparatus for composing a color television signal from the output of the imaging device is made simple.

In the above, an interline type CCD imaging device is used as an imaging device to be covered with color filters shown in FIGS. 7, 12 and 14. The imaging device is not limited to the interline type CCD imaging device. A frame transfer type CCD imaging device may be used. The frame transfer type CCD imaging device covered with a color filter shown in FIG. 7 is exemplarily shown in FIG. 16. A plurality of transparent electrodes 21 are isolatedly disposed on a silicon substrate 20. A color filter 22 covers the electrodes 21 so that one filter element covers two electrodes. For transferring charges, four phase pulses $\phi_1$, $\phi_2$, $\phi_3$ and $\phi_4$ are used. The pulses $\phi_1$ and $\phi_2$ are applied to the electrodes 21 under the filter element in rows $l_2$, $l_4$, $l_6$.... The remaining clock pulses $\phi_3$ and $\phi_4$ are applied to other electrodes 21 under the filter elements in rows $l_1$, $l_3$, $l_5$....

FIGS. 16(B) and 16(C) show potential distributions under electrodes. For interlacing, the clocks $\phi_2$ and $\phi_3$ take a potential which generates potential wells in the substrate 20 in odd number fields, as shown in FIG. 16(B), mixing outputs based on two filter elements in the rows $l_1$ and $l_2$, the rows $l_3$ and $l_4$, the rows $l_5$ and $l_6$ and so on. After the charge accumulation, the clocks $\phi_1$, $\phi_2$, $\phi_3$ and $\phi_4$ operates as transfer pulses having four phases to transfer the accumulated charges in the direction along the arrow. On the other hand, in even number fields, the clocks $\phi_1$ and $\phi_4$ take a potential which generates potential wells in the substrate, as shown in FIG. 16(C), mixing outputs based on two filter elements in the rows $l_2$ and $l_3$ the rows $l_4$ and $l_5$ and so on. After the charge accumulation, the clocks $\phi_1$, $\phi_2$, $\phi_3$ and $\phi_4$ return to the original transfer pulses having four phases to transfer the accumulated charges in the direction along the arrow.

The accumulated charges for the odd and even number fields have similar combination of rows in color filter to the charges mixed in accordance with the use of the interline type CCD imaging device. Therefore, the color television signal may be composed by the imaging apparatus as shown in FIGS. 6 or 13.

Although some embodiments are explained in the above, it is apparent to the skilled in the art that the kinds of filter element adaptable to the color filter, the transmitting characteristics of filter elements and/or the arrangement of filter elements are not limited to the embodiments.

What is claimed is:

1. A solid-state color image sensor comprising a solid-state imaging device having a plurality of imaging elements and a color filter covering said solid-state imaging device, said color filter having a plurality of filter elements arranged in rows and columns, each of said filter elements transmitting red, green, and blue light over its entire surface area with corresponding transmittances of at least 20 to 80 percent for each said color light.

2. A solid-state color image sensor as claimed in claim 1, wherein said filter elements comprise:
   yellow filters each transmitting red and green light, and also transmitting blue light with a transmittance of 20 to 80 percent;
   cyan filters each transmitting blue and green light, and also transmitting red light with a transmittance of 20 to 80 percent; and
   green filters each transmitting green light, and also transmitting blue and red light with respective transmittances of 20 to 80 percent, 3. A solid-state color image sensor as claimed in claim 2, wherein said filter elements further comprise white filters each transmitting red, green, and blue light.

4. A solid-state image sensor as claimed in claim 2, wherein said filter elements further comprise magenta filters each transmitting blue and red light, and also transmitting green light with a transmittance of approximately fifty percent.

5. A color filter for use with a solid-state imaging device, said color filter comprising:
   a plurality of magenta filter elements each transmitting blue and red light, each said magenta filter element also transmitting green light with a transmittance of approximately fifty percent;
   a plurality of yellow filter elements each transmitting red and green light, each said yellow filter element also transmitting blue light with a transmittance of 30 to 60 percent;
   a plurality of cyan filter elements each transmitting blue and green light, each said cyan filter also transmitting red light with a transmittance of 30 to 60 percent; and
   a plurality of green filter elements each transmitting green light, each said green filter element also transmitting blue and red light with respective transmittance of 30 to 60 percent;
   said magenta, yellow, cyan, and green filter elements being arranged in a matrix of rows and columns of filter elements, first columns of said matrix comprising a repetitive sequential arrangement of filter elements disposed in the order of a magenta, a cyan, a green and a cyan filter element, and second columns of said matrix comprising a repetitive sequential arrangement of filter elements disposed in the order of a green, a yellow, a magenta, and a yellow filter element;
   said matrix of rows and columns of filter elements being formed by a repetitive sequential arrangement of said first and second columns, with filter elements of said sequentially arranged columns forming said rows of said matrix.

* * * * *